Patented May 21, 1935

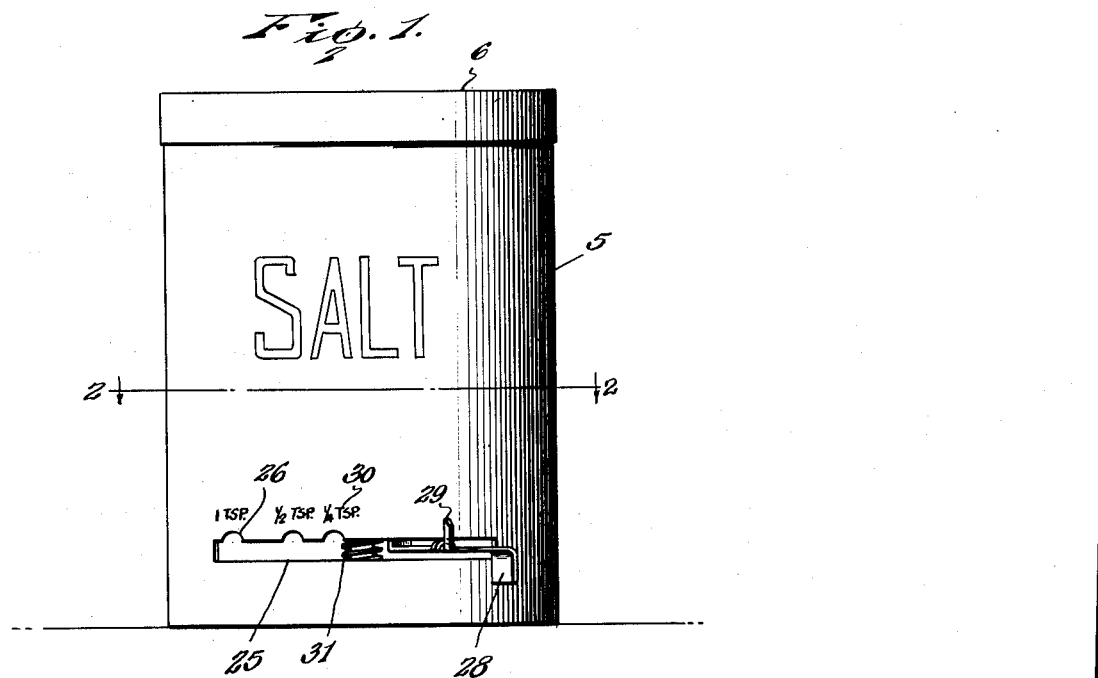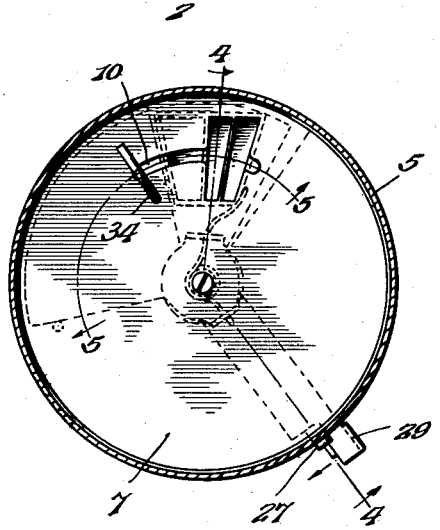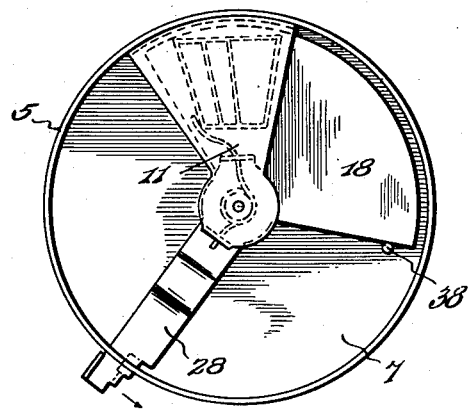

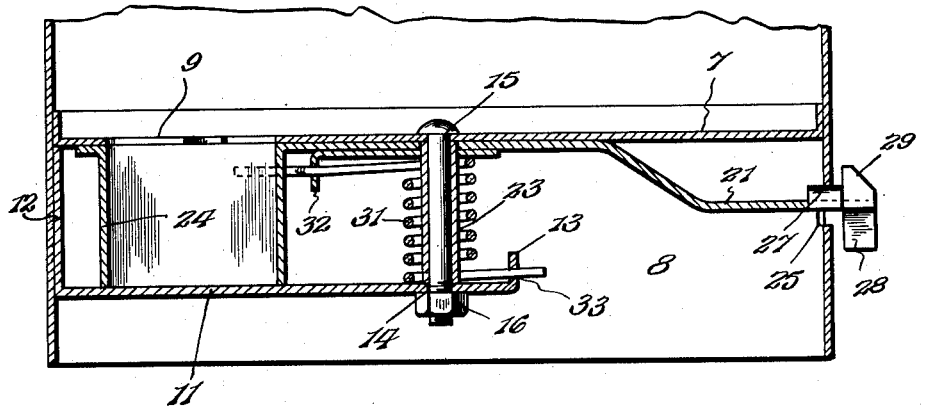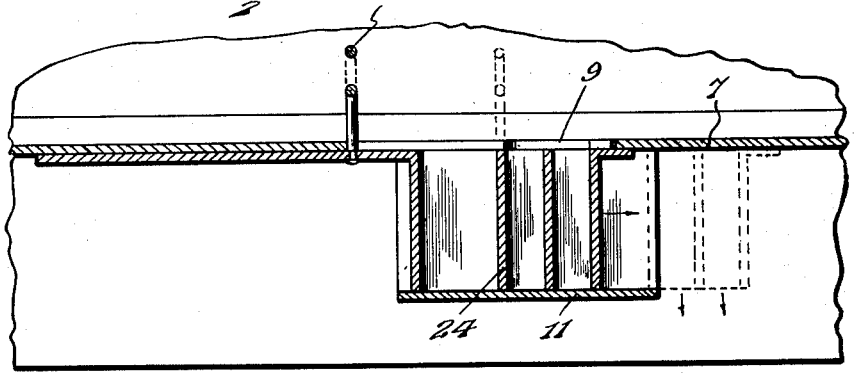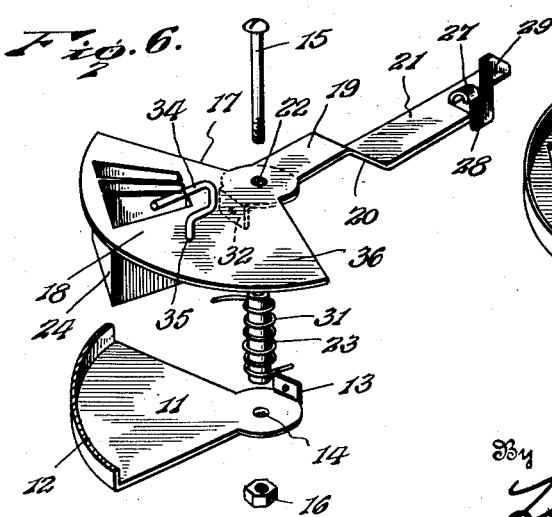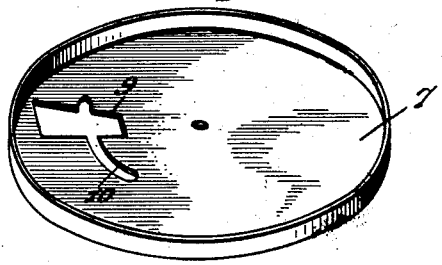

2,002,039

UNITED STATES PATENT OFFICE 2,002,039

CONDIMENT MEASURING AND DISPENSING DEVICE

Harold L. McPhee, Chicago, Ill.

Application April 23, 1934, Serial No. 721,996

4 Claims. (Cl. 221—109)

This invention relates to dispensing devices and more particularly to means for dispensing condiments used in the cooking and baking of food stuffs.

It is a well-known fact that no matter how thoroughly food may be cooked or how delicious it may appear when served, the food is apt to be insipid and unpalatable if not properly flavored or seasoned. As the amount of seasoning applied to the food is usually left to the discretion or good judgment of the cook, who, in the absence of proper measuring facilities, or through neglect, often dispenses condiment with too lavish or too frugal a hand, the food, in many cases, is either over or under seasoned and, consequently, lacks that tasty and appetizing flavor which properly prepared food should have.

The object of the present invention is, therefore, the provision of a dispensing device of simple and efficient construction by means of which the element of chance in dispensing condiments, when cooking food, will be eliminated and the food given the proper amount of seasoning necessary to impart the desired flavor thereto.

A further object of the invention is to provide a condiment receptacle having a discharge opening in the bottom thereof and provided with a spring-actuated dispensing element or valve having measuring pockets therein movable successively beneath the opening in the receptacle to permit the discharge of the contents of any or all of the pockets.

A further object of the invention is to provide a dispensing device, the receptacle of which is formed with a series of notches or depressions adapted to receive a lug or detent on the operating handle of the dispensing valve so as to hold any desired pocket in discharging position, means being provided for automatically returning the valve to normal position with the pockets ready to receive the condiment after each operation of said valve.

A further object is to provide means for agitating or loosening the condiment or other material within the receptacle as the dispensing valve is reciprocated and to so construct said valve that one end thereof constitutes a cut-off to prevent escape of the material from the receptacle during the discharge of the condiment from the measuring pockets.

A still further object of the invention is generally to improve this class of devices so as to increase their utility, durability and efficiency.

Similar numerals of reference indicate corresponding parts in all the figures of the drawings.

Figure 1 is a side elevation of a dispensing device constructed in accordance with the present invention.

Figure 2 is a transverse sectional view taken on the line 2—2 of Figure 1.

Figure 3 is a bottom plan view.

Figure 4 is an enlarged transverse sectional view taken on the line 4—4 of Figure 2.

Figure 5 is a similar view taken on the line 5—5 of Figure 2.

Figure 6 is a perspective view of the dispensing valve and its associated parts detached.

Figure 7 is a perspective view of the bottom of the can or receptacle detached.

The improved dispensing device, forming the subject-matter of the present invention, is shown in connection with a can or receptacle 5 of standard construction adapted to receive salt, pepper or other material to be dispensed, said can being provided with a cover 6 and a bottom 7 spaced upwardly from the lower edge of the can to form a chamber or compartment 8 under the bottom within which the dispensing mechanism operates and is housed and protected. The bottom 7 is formed with a discharge opening 9 preferably arranged at one side of the vertical axis of the receptacle and communicating with said discharge opening is an arcuate slot 10, the purpose of which will be more particularly referred to hereinafter. Disposed in spaced relation to the bottom 7 is a stationary closure plate 11 having one end thereof provided with an upstanding flange 12 which is soldered or otherwise rigidly secured to the interior of the receptacle 5 and its opposite end provided with an upstanding lip 13. An opening 14 is formed in the plate 11 adjacent the lip 13 and extending through said opening and through a corresponding opening in the bottom 7 of the receptacle is a bolt 15, the threaded end of which receives a clamping nut 16. Mounted for reciprocation within the compartment 8 is a dispensing valve 17 consisting of a flat arcuate plate 18 and a reduced shank 19 preferably offset at 20 and thence extending longitudinally to form an operating handle 21. The dispensing element is provided with an opening 22 which receives the bolt 15 so that the dispensing valve is free to swing laterally with the bolt as a pivot. A spacing sleeve 23 is preferably interposed between the plate 11 and the bottom 7 of the receptacle and the upper end of this sleeve fits within the opening 22, as best shown in Figure 4 of the drawings. Depending from the arcuate head 18 of the valve are a plurality of depending dispensing tubes 24 preferably three in number and adapted to contain predetermined quantities of the material to be dispensed. The upper ends of the tubes 24 open through the upper surface of the arcuate plate 18 while the lower ends thereof are open and adapted to move across the closure plate 11. These dispensing tubes may be made of a size to accommodate any predetermined quantity of condiment, but it is preferred to so proportion the tubes that the first and second tubes will each contain exactly one-fourth of a teaspoonful of salt or other material, while the last tube will contain one-half of a teaspoonful of said material so that the combined capacity of the three tubes equals exactly one teaspoonful.

Formed in that part of the receptacle 5 between the bottom 7 and the lower edge of the receptacle is a slot 25 having spaced notches 26 in the upper edge thereof adapted to receive a spring lug or detent 27 formed by cutting and bending the metal of the handle 21 upwardly, as best shown in Figure 6 of the drawings. A portion of the metal at the end of the handle and adjacent the detent 27 is pressed downwardly to form a finger piece 28 and another portion thereof bent upwardly to form a pointer or indicator 29 which is adapted to register with suitable indicia 30 arranged above each notch 26 so as to indicate to the operator the exact amount of material being dispensed.

Encircling the tube 23 is a coil spring 31, one end of which is anchored in a lug 32 carried by the dispensing valve and the other end thereof anchored in an opening 33 formed in the upstanding lip 13, and the tendency of this spring is to return the valve to normal position after each operation thereof.

In order to assist in agitating and loosening the material within the receptacle and thus insure easy flow thereof into the dispensing tubes, there is provided an agitator 34 preferably formed of a single length of wire bent into substantially U-shape and having one end thereof rigidly secured to the arcuate plate 18 of the valve, as indicated at 35, and its other end spaced from and disposed parallel with the upper surface of the plate 18, as best shown in Figure 6 of the drawings. The purpose of the slot 10 in the bottom 7 of the receptacle is to accommodate the shank of the agitator as the dispensing valve is reciprocated.

The operating arm 21 is preferably formed of spring metal and the inherent resiliency of the arm will normally hold the detent 27 yieldably against the upper edge of the slot 25 so that as the operating lever is swung laterally in the act of dispensing the condiment, the resiliency of the arm will force the detent 27 upwardly into one of the notches and hold the valve in a set position. As soon as the detent is disengaged from the notch, the spring will automatically return the valve to normal position. A stop pin or lug 38 preferably depends from the bottom of the receptacle for engagement with the adjacent edge of the valve for limiting the closing movement thereof.

In operation, the receptacle 5 is filled or partially filled with the material to be dispensed and, if, say one-fourth of a teaspoonful of material is desired, the operating lever is swung laterally until the detent 27 reaches the first notch, when it will enter said notch and at the same time the lower end of the first tube will clear the closure plate 11 and permit the discharge of the contents of the tube. If a further quantity of condiment or other material is desired, the lever is moved laterally until the detent 27 engages the successive notches until a full teaspoonful or tablespoonful has been delivered depending upon the number of reciprocations of the lever. If it is desired to dispense a heaping teaspoonful of the material, the lever is swung laterally to the full length of its stroke and then released and again swung laterally until it enters the first notch 30 which will deliver a quantity of the material equal to a heaping teaspoonful.

It will here be noted that the arcuate plate 18 of the dispensing valve is of sufficient length so that when the operating lever is swung laterally to the full limit of its movement with all three measuring tubes discharging, the end 36 will pass beneath and automatically close the discharge opening in the bottom of the receptacle so as to form, in effect, an automatic cut-off and prevent the material within the receptacle from being wasted during the discharge of the contents of the tubes. As the measuring valve is reciprocated, the member 34 will move back and forth within the receptacle and thus insure a free flow of the material through the discharge opening.

The devices may be made in different sizes and shapes and provided with any desired number of dispensing tubes, and the size of said tubes may vary according to the desired quantity of material to be discharged from the receptacle. The device is extremely simple in construction and provides an accurate measure for supplying seasoning to foods so that nothing is left to the judgment of the cook and the food will have the tasty appetizing flavor which properly prepared food should have.

Having thus described the invention, I claim:

1. A dispensing device including a receptacle having a discharge opening in the bottom thereof, a reciprocating valve disposed beneath the bottom of the receptacle and provided with a plurality of measuring pockets, a stationary plate forming a closure for the lower ends of said pockets, a pivot bolt extending through the bottom of the receptacle and through the valve and the stationary plate, a spacing sleeve fitted about the bolt, a spring coiled around the spacing sleeve and having one end thereof connected with the stationary plate and the other with the valve, an operating handle extending laterally from the valve and projecting through a slot in the receptacle, and means carried by the handle and coacting with one wall of the slot for holding the operating handle in different positions of adjustment.

2. A dispensing device including a receptacle having a discharge opening in the bottom thereof and a circumferentially extending slot in its walls under the bottom, a spring actuated valve pivotally mounted under the bottom and having measuring pockets movable successively into and out of position beneath the opening as the valve moves about its pivot, a stationary plate carried by the walls of the receptacle below the valve and forming a closure for the lower ends of the pockets when the pockets are under the opening, an operating handle carried by the valve and extending through the slot in the walls of the receptacle, and means on the handle for engaging cooperating portions of the wall of the slot for holding the valve against accidental movement out of an adjusted position when discharging the contents of a selected pocket.

3. A dispensing device including a receptacle having walls and a bottom, the bottom being formed with a discharge opening and the walls having a slot located below the bottom and extending circumferentially of the receptacle, one edge wall of the slot being formed with spaced notches, a valve movably mounted below the bottom and having measuring pockets shiftable successively from a filling position beneath the opening to a dispensing position, the valve having a portion moving under the discharge opening to close the opening when the pockets are shifted toward a discharging position, a plate forming a closure for the lower ends of the measuring pockets when in a filling position, a handle extending from the valve through the slot and provided with a resilient detent to engage in a selected notch and secure the valve in an adjusted position, and oppositely disposed wings formed on the outer end of the handle at opposite sides thereof, one wing serving as a pointer.

4. A dispensing device including a receptacle having a discharge opening formed in its bottom and having an arcuate slot leading from a side of the discharge opening, a plate supported below the bottom, a valve pivotally mounted for movement between the bottom and plate and having measuring pockets movable successively from a filling position below the opening to a dispensing position beyond one side of the plate, an agitator carried by and extending upwardly from the valve through the slot to limit and guide movement of the valve about its pivot, the plate serving as a closure for the lower ends of the pockets when the pockets are between the plate and bottom of the receptacle and a portion of the valve serving as a closure for the discharge opening when the pockets are shifted toward a discharging position.

HAROLD L. McPHEE.